United States Patent
Takahashi (10) Patent No.: US 8,656,969 B2
(45) Date of Patent: Feb. 25, 2014

(54) PNEUMATIC TIRE

(75) Inventor: Masanori Takahashi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 286 days.

(21) Appl. No.: 13/001,578

(22) PCT Filed: Jul. 28, 2009

(86) PCT No.: PCT/JP2009/003561
§ 371 (c)(1),
(2), (4) Date: Dec. 27, 2010

(87) PCT Pub. No.: WO2010/013453
PCT Pub. Date: Feb. 4, 2010

(65) Prior Publication Data
US 2011/0108174 A1    May 12, 2011

(30) Foreign Application Priority Data
Jul. 31, 2008    (JP) .................................. 2008-197356

(51) Int. Cl.
*B60C 13/00* (2006.01)
*B60C 13/02* (2006.01)
*B60C 23/18* (2006.01)
*B60C 23/19* (2006.01)

(52) U.S. Cl.
USPC .......................................... 152/153; 152/523

(58) Field of Classification Search
USPC ........................... 152/153, 523–525; D12/605
IPC .................................. B60C 13/00,13/02, 13/04
See application file for complete search history.

(56) References Cited

FOREIGN PATENT DOCUMENTS

| JP | 59-76403 | U | 5/1984 | |
|----|----------|---|--------|----|
| JP | 59076403 | * | 7/1987 | .............. B60C 11/00 |

(Continued)

OTHER PUBLICATIONS

English Abstract Summary of JP04238703A: Terada, Minoru; Pneumatic Tire; Aug. 26, 1992; No date.*

(Continued)

*Primary Examiner* — Richard Crispino
*Assistant Examiner* — Kendra Shin
(74) *Attorney, Agent, or Firm* — Birch, Stewart, Kolasch & Birch, LLP (57) ABSTRACT

A tire (2) includes a tread portion (T) and a pair of side portions (S). An agitating portion (32) is provided on an inner part in a radial direction with respect to a position (PA) indicative of a maximum width over an external surface (34) of each of the side portions (S). The agitating portion (32) includes a large number of dimples (36) which are dented inward from the external surface. An edge of the dimple (36) has a circular contour. A ratio of a depth of the dimple (36) to an outside diameter of the dimple (36) is equal to or higher than 0.2 and is equal to or lower than 0.5. A ratio of a distance between a center of one of the dimples (36) and a center of the other dimple (36) which is close to the one of the dimples 36 to the outside diameter is equal to or higher than 1.2 and is equal to or lower than 2. It is preferable that the outside diameter of the dimple (36) should be equal to or greater than 3 mm and be equal to or smaller than 5 mm in the tire (482). It is preferable that an array pattern of the large number of dimples (36) should be an orthogonal array in the tire (2).

12 Claims, 7 Drawing Sheets

(56) References Cited

FOREIGN PATENT DOCUMENTS

| | | | | |
|---|---|---|---|---|
| JP | 4-238703 A | | 8/1992 | |
| JP | 04238703 A | * | 8/1992 | .............. B60C 13/00 |
| JP | 4-297310 A | | 10/1992 | |
| JP | 04297310 A | * | 10/1992 | .............. B60C 13/00 |
| JP | 10-58925 A | | 3/1998 | |
| JP | 11-321243 A | | 11/1999 | |
| JP | 2000-16030 A | | 1/2000 | |
| JP | 2002205514 | * | 7/2002 | .............. B60C 11/01 |
| JP | 2006-256433 A | | 9/2006 | |
| JP | 2007-50854 A | | 3/2007 | |
| JP | 2008-1249 A | | 1/2008 | |

OTHER PUBLICATIONS

English Abstract Summary of JP04297310A: Nakakita, Kazumasa and Shiraishi, Akira; Pneumatic Tire; Oct. 21, 1992; No date.*

Machine Translation of JP2002205514A: Teramoto Kazuo; Pneumatic Tire for Heavy Load; Jul. 23, 2002; No date.*

Machine Translation of JP59-076403U:Tokieda, Akinori; Tire; Nov. 15, 1982; No date.*

International Search Report dated Sep. 8, 2009 for PCT/JP2009/003561.

Extended European Search Report, dated Apr. 8, 2013, for European Application No. 09802702.2.

* cited by examiner

PNEUMATIC TIRE

TECHNICAL FIELD

The present invention relates to a pneumatic tire.

BACKGROUND ART

A running tire supports a vehicle body while carrying out a rotation. In the tire, a deformation and a restoration are repeated alternately. The repetition of the deformation and the restoration causes a generation of heat over the tire.

In respect of the fact that a vehicle can run continuously by a certain distance at a high speed in a puncture, a run flat tire having a reinforcing rubber layer provided in a sidewall portion is disclosed in Japanese Laid-Open Patent Publication No. 2007-50854. In the sidewall portion of the run flat tire, there is provided a plurality of radiating groove-shaped portions which can effectively dissipate heat stored in the reinforcing rubber layer in a running operation in a puncture state.
Patent Document 1: Japanese Laid-Open Patent Publication No. 2007-50854

DISCLOSURE OF THE INVENTION

Problems that the Invention is to Solve

In a running tire, a bead portion is mainly deformed. Therefore, a temperature of the bead portion rises. The rise in the temperature causes a damage such as a separation or a breakage of a carcass. The tire has a poor durability.

In the tire, a reinforcing rubber layer is not provided in a sidewall portion differently from the run flat tire. A thickness of the sidewall portion in the tire is smaller than that of the run flat tire. In respect of a maintenance of a stiffness of the tire, it is impossible to provide the radiating groove-shaped portion in the tire.

It is an object of the present invention to provide a pneumatic tire which is excellent in a durability.

Means for Solving the Problems

A pneumatic tire according to the present invention includes a tread portion and a pair of side portions. An agitating portion is provided on an external surface of each of the side portions. The agitating portion includes a large number of dimples which are dented inward from the external surface. An edge of the dimple has a circular contour. A ratio of a depth of the dimple to an outside diameter of the dimple is equal to or higher than 0.2 and is equal to or lower than 0.5.

In the tire, it is preferable that a ratio of a distance between a center of one of the large number of dimples and a center of the other dimple which is close to the one of the dimples to the outside diameter should be equal to or higher than 1.2 and be equal to or lower than 2.

In the tire, it is preferable that the outside diameter of the dimple should be equal to or greater than 3 mm and be equal to or smaller than 10 mm.

Another pneumatic tire according to the present invention includes a tread portion and a pair of side portions. An agitating portion is provided on an external surface of each of the side portions. The agitating portion includes a large number of dimples and pimples. The respective dimples are dented inward from the external surface. An edge of the dimple has a circular contour. A ratio of a depth of the dimple to an outside diameter of the dimple is equal to or higher than 0.2 and is equal to or lower than 0.5. The respective pimples are protruded outward from the external surface. An edge of the pimple has a circular contour. A ratio of a height of the pimple to an outside diameter of the pimple is equal to or higher than 0.2 and is equal to or lower than 0.5. An array pattern of the dimples and the pimples is an orthogonal array. The dimples and the pimples are arranged alternately.

A further pneumatic tire according to the present invention includes a tread portion and a pair of side portions. An agitating portion is provided on an external surface of each of the side portions. The agitating portion includes a large number of dimples and pimples. The respective dimples are dented inward from the external surface. An edge of the dimple has a circular contour. A ratio of a depth of the dimple to an outside diameter of the dimple is equal to or higher than 0.2 and is equal to or lower than 0.5. The respective pimples are protruded outward from the external surface. An edge of the pimple has a circular contour. A ratio of a height of the pimple to an outside diameter of the pimple is equal to or higher than 0.2 and is equal to or lower than 0.5. An array pattern of the dimples and the pimples is a zigzag array. Six pimples are close to one of the dimples.

Effect of the Invention

In the tire, the agitating portion including a large number of dimples is provided on the external surface of the side portion. The agitating portion can agitate air which is present around the running tire. The agitation can suppress a rise in a temperature of the side portion. In the tire, it is possible to suppress a damage such as a separation or a breakage of a carcass. The tire is excellent in a durability.

| EXPLANATION OF DESIGNATIONS | |
| --- | --- |
| 2, 48, 64 | tire |
| 4 | tread |
| 6 | sidewall |
| 8 | bead |
| 10 | carcass |
| 12 | belt |
| 14 | inner liner |
| 16 | chafer |
| 18 | tread surface |
| 20 | groove |
| 22 | core |
| 24 | apex |
| 26 | carcass ply |
| 28 | inner layer |
| 30 | outer layer |
| 32, 50, 60 | agitating portion |

-continued

| EXPLANATION OF DESIGNATIONS | |
|---|---|
| 34 | external surface |
| 36 | dimple |
| 52, 68 | agitator |

BEST MODE FOR CARRYING OUT THE INVENTION

The present invention will be described below in detail based on preferred embodiments with reference to the drawings.

Figure 1:
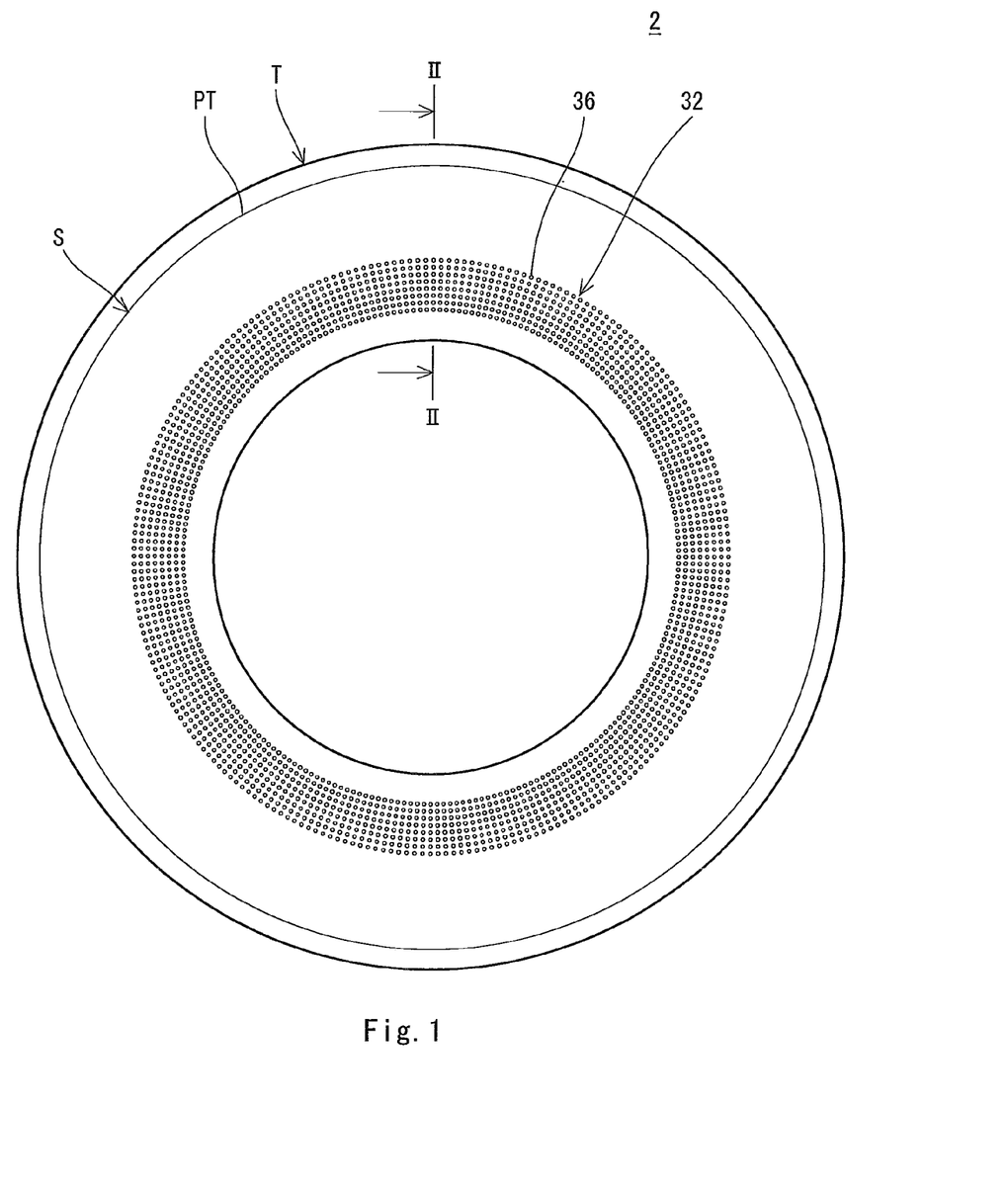
FIG. 1 is a side view showing a pneumatic tire according to an embodiment of the present invention.
Figure 2:
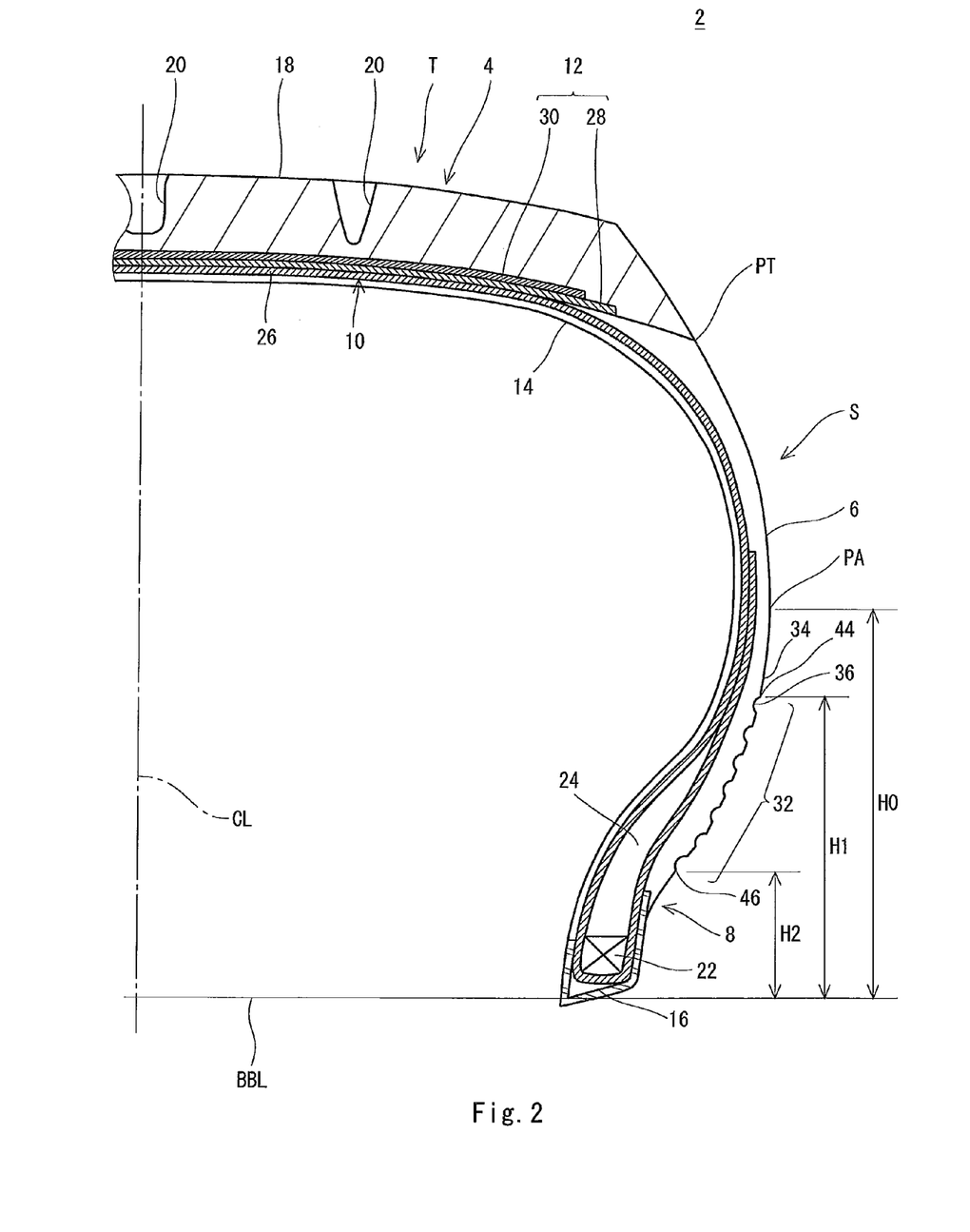
FIG. 2 is a sectional view taken along a II-II line in FIG. 1.

FIG. 1 shows a side surface of a tire 2. FIG. 2 shows a part of the tire 2. The tire 2 includes a tread 4, a sidewall 6, a bead 8, a carcass 10, a belt 12, an inner liner 14 and a chafer 16. The tire 2 can be divided into a tread portion T and a pair of side portions S. The tire 2 is of a tubeless type. The tire 2 is attached to a passenger car. In FIG. 2, a vertical direction indicates a radial direction, a transverse direction indicates an axial direction, and a perpendicular direction to a paper indicates a circumferential direction. The circumferential direction also serves as a rotating direction of the tire. The tire 2 takes an almost symmetrical shape with respect to a one-dotted chain line CL in FIG. 2. The one-dotted chain line CL represents an equator plane of the tire 2.

The tread 4 is constituted by a crosslinked rubber which is excellent in an abrasion resistance. The tread 4 takes an outward convex shape in the radial direction. The tread 4 includes a tread surface 18. The tread surface 18 comes in contact with a road surface. A groove 20 is provided on the tread surface 18. A tread pattern is formed by the groove 20. The groove 20 does not need to be provided on the tread 4.

The sidewall 6 is extended almost inward in the radial direction from an end of the tread 4. The sidewall 6 is constituted by a crosslinked rubber. The sidewall 6 absorbs a shock from the road surface by a flexure. Furthermore, the sidewall 6 prevents an external damage of the carcass 10.

The bead 8 is positioned on an almost inside in the radial direction with respect to the sidewall 6. The bead 8 includes a core 22 and an apex 24 extended outward in the radial direction from the core 22. The core 22 is ring-shaped. The core 22 includes a plurality of non-extensible wires (typically wires formed of steel). The apex 24 is tapered outward in the radial direction. The apex 24 is constituted by a crosslinked rubber having a high hardness.

The carcass 10 is formed by a carcass ply 26. The carcass ply 26 is laid between the beads 8 on both sides and is provided along an inside of the tread 4 and the sidewall 6. The carcass ply 26 is folded back from an inside toward an outside in the axial direction around the core 22.

The carcass ply 26 is formed by a large number of cords provided in parallel and a topping rubber, which is not shown. An absolute value of an angle formed by each of the cords with respect to the equator plane is usually 70° to 90°. In other words, the carcass 10 has a radial structure. The cord is usually constituted by an organic fiber. For a preferable organic fiber, it is also possible to employ a polyester fiber, a nylon fiber, a rayon fiber, a polyethylene naphthalate fiber and an aramid fiber. The carcass 10 having a bias structure may be employed.

The belt 12 is positioned on an outside in the radial direction with respect to the carcass 10. The belt 12 is provided on the carcass 10. The belt 12 reinforces the carcass 10. The belt 12 is formed by an inner layer 28 and an outer layer 30. Each of the inner layer 28 and the outer layer 30 is constituted by a large number of cords provided in parallel and a topping rubber, which is not shown. Each of the cords is tilted with respect to the equator plane. An absolute value of a tilt angle is equal to or greater than 10° and is equal to or smaller than 35°. A tilt direction of the cord of the inner layer 28 is reverse to a tilt direction of the cord of the outer layer 30. A preferable material of the cord is steel. An organic fiber may be used for the cord.

The inner liner 14 is bonded to an inner peripheral surface of the carcass 10. The inner liner 14 is constituted by a crosslinked rubber. A rubber having an excellent air insulating property is used for the inner liner 14. The inner liner 14 plays a part in holding an internal pressure of the tire 2.

The chafer 16 is positioned in the vicinity of the bead 8. When the tire 2 is incorporated into a rim, the chafer 16 abuts on the rim. By the abutment, the vicinity of the bead 8 is protected. The chafer 16 is usually constituted by a cloth and a rubber impregnated into the cloth. It is also possible to use the chafer 16 which is formed by a rubber unit.

As shown in FIG. 1, an agitating portion 32 is further provided on an external surface in the tire 2. The agitating portion 32 is extended in the circumferential direction. The agitating portion 32 takes a shape of a ring.

In FIG. 2, a point PT indicates an end positioned on an outside in the axial direction of the tread 4. In this specification, an outer part in the radial direction with respect to the point PT is indicated as the tread portion T and an inner part in the radial direction with respect to the point PT is indicated as the side portion S in the tire 2. In FIG. 2, a point PA represents a position indicative of a maximum width of the tire 2.

In the tire 2, the agitating portion 32 is provided on an external surface 34 of the side portion S. The agitating portion 32 is positioned on an inner part of the external surface 34 in the radial direction with respect to the point PA. The agitating portion 32 is positioned in the vicinity of the bead 8. The agitating portion 32 is disposed to be positioned on an outside in the radial direction with respect to a flange of a rim (not shown) in which the tire 2 is to be incorporated. A portion in which the agitating portion 32 is disposed is also referred to as a bead region. The agitating portion 32 may be positioned on an outer part of the external surface 34 in the radial direction with respect to the point PA. As shown in FIGS. 1 and 2, the agitating portion 32 includes a large number of dimples 36 which are dented inward from the external surface 34. The agitating portion 32 may include a pimple which is protruded outward from the external surface 34 in addition to the dimples 36. The agitating portion 32 of the tire 2 in FIG. 1 does not include the pimple.

Figure 3:
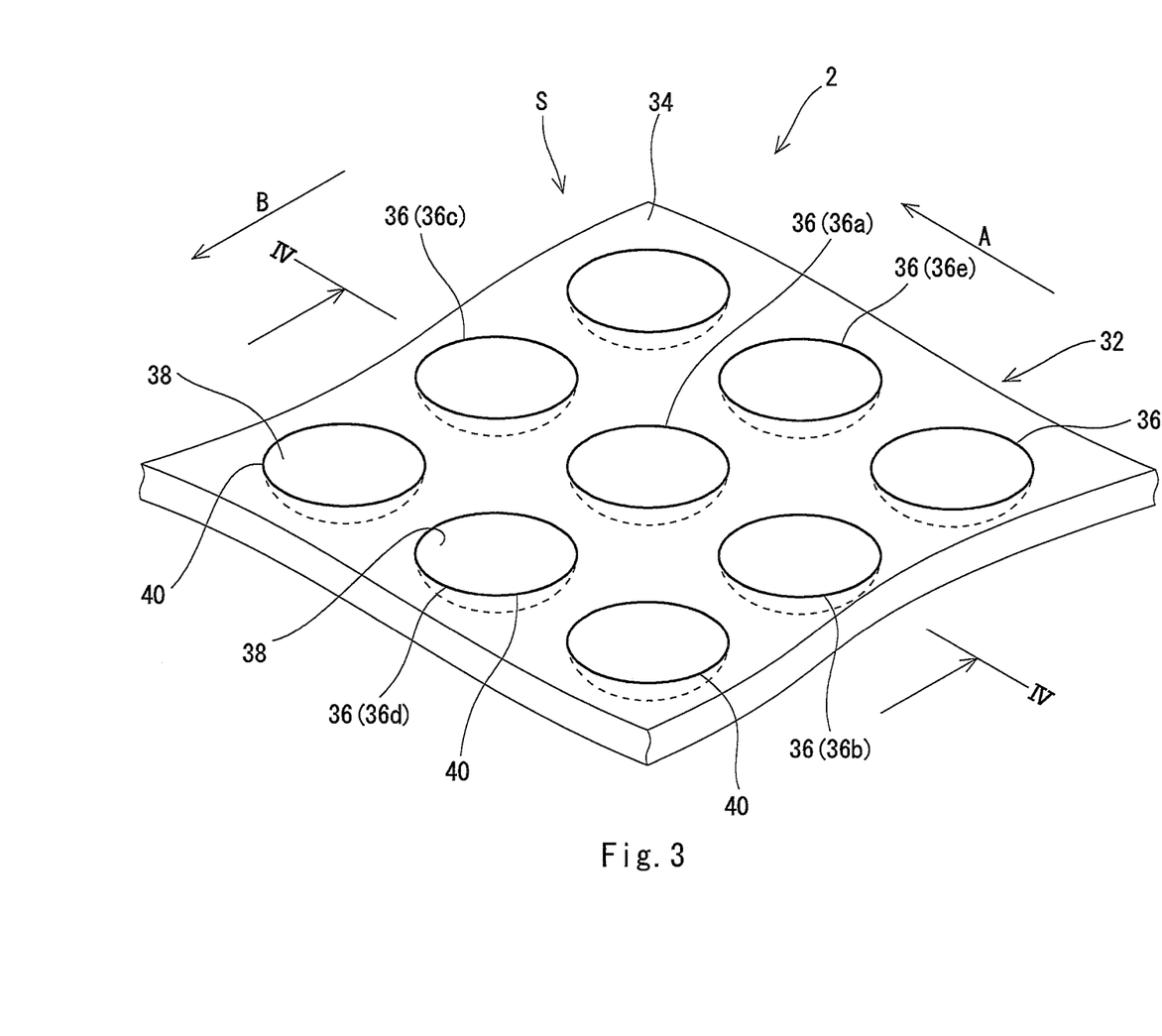
FIG. 3 is a perspective view showing a part of a side portion S in the tire of FIG. 1.

FIG. 3 shows a part of the agitating portion 32 provided on the external surface 34 of the side portion S. In FIG. 3, a direction shown in an arrow line A represents an outward azimuth in the radial direction. A direction shown in an arrow line B represents a normal rotating direction of the tire 2.

As shown in the drawing, a dimple 36b is positioned on an inside in the radial direction of a dimple 36a and a dimple 36c is positioned on an outside in the radial direction of the dimple 36a. The dimples 36a, 36b and 36c are arranged in the radial direction. In the tire 2, particularly, the dimples 36a, 36b and 36c are arranged at a regular interval in the radial direction. In the tire 2, a dimple 36d is positioned on a normal rotating side of the dimple 36a and a dimple 36e is positioned on a reverse rotating side of the dimple 36a. The dimples 36a, 36d and 36e are arranged in a rotating direction. In the tire 2, particularly, the dimples 36a, 36d and 36e are arranged at a regular interval in the rotating direction. In other words, in the tire 2, the agitating portion 32 has a structure in which a large number of units constituted by a plurality of dimples 36 arranged at the regular interval in the radial direction are disposed at a regular interval in the normal rotating direction.

In FIG. 3, the unit formed by the dimples 36a, 36b and 36c arranged in the radial direction and the unit formed by the dimples 36a, 36d and 36e arranged in the rotating direction intersect with each other through the dimple 36a. The dimples 36b, 36c, 36d and 36e are close to the dimple 36a. An array pattern of the dimples 36 is referred to as an orthogonal array. In the tire 2, a large number of dimples 36 are properly distributed over the external surface 34 of the side portion S. Therefore, a uniformity is prevented from being inhibited by the dimples 36. The array pattern of the dimples 36 is not restricted to the orthogonal array but is properly determined in consideration of a specification of the tire 2.

In the tire 2, a surface 38 of the dimple 36 is extended concentrically from a bottom thereof. An edge 40 of the dimple 36 is positioned in a boundary part between the dimple 36 and the external surface 34 of the side portion S. In the tire 2, the edge 40 has a circular contour. For this reason, a stress caused by a distortion of the tire 2 can be properly distributed at the edge 40. In the tire 2, a durability of the tire 2 can be prevented from being inhibited by the dimple 36.

Figure 4:
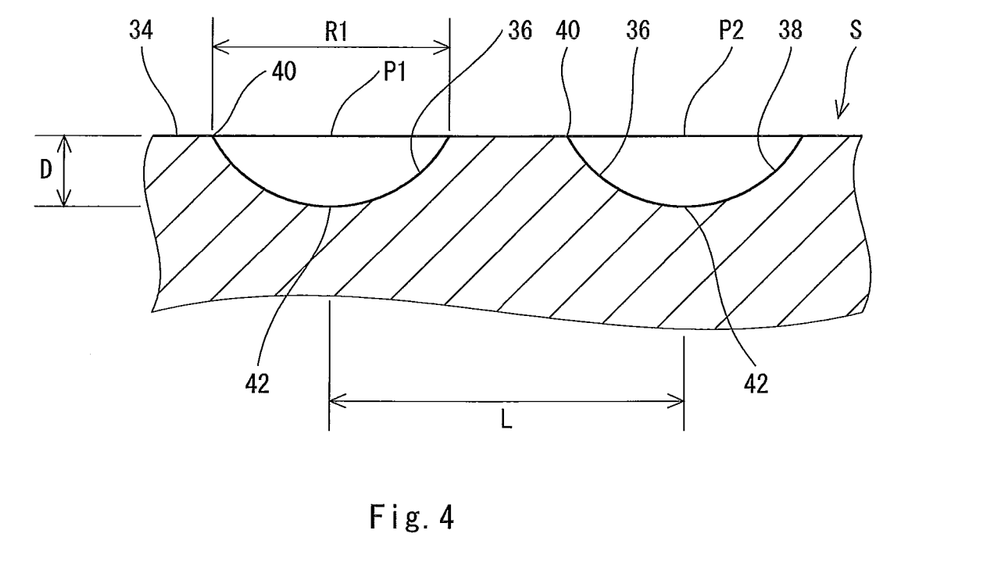
FIG. 4 is a sectional view taken along a IV-IV line in FIG. 3.

FIG. 4 shows a section of the dimple 36. In the tire 2, the dimple 36 is dented inward from the external surface 34 of the side portion S. The surface 38 of the dimple 36 takes a shape of a cup. As shown in FIG. 4, in the section of the dimple 36, the surface 38 of the dimple 36 takes a shape of an arc.

The tire 2 is manufactured in the following manner. In a former, rubber members, for example, the inner liner 14, the carcass 10, the bead 8, the sidewall 6, the belt 12, the tread 4 and the like are assembled so that a raw cover (which is also referred to as an uncrosslinked tire) is obtained. A step of obtaining the raw cover is referred to as a forming step.

The raw cover is subjected to a vulcanizing step. At the vulcanizing step, the raw cover is put into an opened mold (not shown). In the putting operation, a bladder (not shown) contracts. By the putting operation, the bladder is positioned on an inside of the raw cover. By filling a gas, the bladder expands. By the expansion, the raw cover is deformed. The deformation is referred to as shaping. The mold is fastened so that an internal pressure of the bladder is raised. The raw cover is interposed between a cavity surface of the mold and an external surface of the bladder and is thus pressurized. The raw cover is heated by a thermal conduction from the bladder and the mold.

In the mold, a shape of the cavity surface corresponds to a shape of the external surface 34 in the tire 2. In the mold, a large number of projections are provided in positions over the cavity surface which correspond to the bead region of the tire 2.

A rubber composition of the raw cover flows by the pressurization and the heating. By the pressurization and the heating, the projection sinks into the rubber composition. The rubber composition causes a crosslinking reaction by the heating so that the tire 2 is obtained. In the tire 2, the dimple 36 is formed in a portion in which the projection sinks.

As described above, in the tire 2, the large number of dimples 36 are provided on the external surface 34 of the side portion S. The dimples 36 are dented inward from the external surface 34. Therefore, it is possible to agitate air which is present around the running tire 2. By the agitation, it is possible to suppress a rise in the temperature of the side portion S. In the tire 2, it is possible to suppress a damage such as a separation or a breakage of the carcass 10. The tire 2 is excellent in a durability. The dimple 36 can contribute to a reduction in a weight of the tire 2.

In the tire 2, the dimple 36 is disposed on an inner part in the radial direction with respect to a position indicative of a maximum width over the external surface 34 of the side portion S. In other words, in the tire 2, the dimple 36 is positioned in the vicinity of the bead 8. In the tire 2, the dimple 36 can suppress a rise in a temperature of the vicinal part of the bead 8. In the tire 2, it is possible to suppress the damage such as the separation or the breakage of the carcass 10. The tire 2 is excellent in the durability.

In FIG. 4, a double arrow line R1 represents an outside diameter of the dimple 36. The outside diameter R1 of the dimple 36 indicates a diameter of a circle representing a contour of the edge 40 of the dimple 36. A point P1 indicates a center of the circle representing the contour of the edge 40 of one of the dimples 36. A point P2 represents a center of a circle representing a contour of the edge 40 of another dimple 36 which is close to the one of the dimples 36. A double arrow line L represents a distance between the centers P1 and P2. A double arrow line D represents a depth of the dimple 36. The depth D is obtained by measuring a height from the external surface 34 of the side portion S to a bottom 42 of the dimple 36.

In the tire 2, it is preferable that the outside diameter R1 should be equal to or greater than 3 mm and be equal to or smaller than 10 mm. By setting the outside diameter R to be equal to or greater than 3 mm, the dimple 36 can effectively agitate the air. In the tire 2 including the dimple 36, it is possible to suppress the rise in the temperature. The tire 2 is excellent in the durability. In this respect, it is more preferable that the outside diameter R1 should be equal to or greater than 3.5 mm. By setting the outside diameter R1 to be equal to or smaller than 10 mm, it is possible to properly maintain the stiffness of the tire 2. In the tire 2, it is possible to maintain an excellent running performance. From this viewpoint, it is more preferable that the outside diameter R1 should be equal to or smaller than 7 mm.

In the tire 2, a ratio of the distance L to the outside diameter R1 is equal to or higher than 1.2 and is equal to or lower than 2. By setting the ratio to be equal to or higher than 1.2, an interval between the dimples 36 provided on the external surface 34 of the side portion S can be prevented from being excessively reduced. It is possible to properly maintain the number of the dimples 36 provided on the external surface 34. Therefore, it is possible to suppress an excessive increase in the weight of the tire 2. In the tire 2, it is possible to maintain an excellent running performance. From this viewpoint, it is more preferable that the ratio should be equal to or higher than 1.3. By setting the ratio to be equal to or lower than 2, it is possible to properly maintain the distance between the dimples 36. The dimple 36 can effectively agitate the air. In the tire 2, therefore, it is possible to suppress the rise in the temperature. The tire 2 is excellent in the durability. From this viewpoint, it is more preferable that the ratio should be equal to or lower than 1.9.

In the tire 2, a ratio of the depth D to the outside diameter R1 is equal to or higher than 0.2 and is equal to or lower than 0.5. By setting the ratio to be equal to or higher than 0.2, the dimple 36 can effectively agitate the air. In the tire 2 including the dimple 36, it is possible to suppress the rise in the temperature. The tire 2 is excellent in the durability. From this viewpoint, the ratio is more preferably equal to or higher than 0.3 and is further preferably equal to or higher than 0.35. By setting the ratio to be equal to or lower than 0.5, it is possible to properly maintain the agitating effect of the dimple 36. Also in the tire 2, it is possible to suppress the rise in the temperature. From this viewpoint, it is more preferable that the ratio should be equal to or lower than 0.45.

In FIG. 2, a solid line BBL represents a bead base line. The bead base line indicates a line for defining a rim diameter (see JATMA) of a rim to which the tire 2 is to be attached. A double arrow line H0 represents a height in the radial direction from the bead base line to the position (PA) indicative of the maximum width of the tire 2. A double arrow line H1 represents a height in the radial direction from the bead base line to an end 44 (an outer end) positioned on an outside in the radial direction with respect to the agitating portion 32. The outer end 44 is an outer part in the radial direction with respect to the edge 40 of the dimple 36 positioned on the outside in the radial direction in the dimple 36 constituting the agitating portion 32. A double arrow line H2 represents a height in the radial direction from the bead base line to an end 46 (an inner end) positioned on an inside in the radial direction with respect to the agitating portion 32. The inner end 46 is an inner part in the radial direction with respect to the edge 40 of the dimple 36 positioned on the inside in the radial direction in the dimple 36 constituting the agitating portion 32.

In the tire 2, it is preferable that a ratio of the height H1 to the height H0 should be equal to or higher than 0.7 and be equal to or lower than 1.0. By setting the ratio to be equal to or higher than 0.7, the agitating portion 32 can effectively agitate the air. In the tire 2 including the agitating portion 32, it is possible to suppress the rise in the temperature. The tire 2 is excellent in the durability. From this viewpoint, it is more preferable that the ratio should be equal to or higher than 0.8. By setting the ratio to be equal to or lower than 1.0, it is possible to properly maintain the weight of the tire 2. In the tire 2, it is possible to maintain an excellent running performance.

In the tire 2, it is preferable that a ratio of the height H2 to the height H0 should be equal to or higher than 0.2 and be equal to or lower than 0.5. By setting the ratio to be equal to or lower than 0.2, the agitating portion 32 is disposed to be positioned on the outside in the radial direction with respect to the flange of the rim (not shown) into which the tire 2 is to be incorporated. The agitating portion 32 can effectively contribute to the agitation of the air. In the tire 2 including the agitating portion 32, it is possible to suppress the rise in the temperature. The tire 2 is excellent in the durability. From this viewpoint, it is more preferable that the ratio should be equal to or higher than 0.3. By setting the ratio to be equal to or lower than 0.5, the agitating portion 32 can effectively suppress a rise in a temperature of the bead region. The tire 2 is excellent in the durability.

In the present invention, the dimension and the angle of each member in the tire 2 and a tire which will be described below are measured in a state in which the tire 2 is incorporated in a normal rim and is filled with air to obtain a normal internal pressure. During the measurement, a load is not applied to the tire 2. In this specification, the normal rim implies a rim determined in rules on which the tire 2 depends. A "standard rim" in the JATMA rules, a "Design Rim" in the TR rules and a "Measuring Rim" in the ETRTO rules are included in the normal rim. In this specification, the normal internal pressure implies an internal pressure determined in the rules on which the tire 2 depends. A "maximum air pressure" in the JATMA rules, a "maximum value" described in "TIRE LOAD LIMITS AT VARIOUS COLD INFLATION PRESSURES" in the TR rules and an "INFLATION PRESSURE" in the ETRTO rules are included in the normal internal pressure. In case of the tire 2 for a passenger car, the dimension and the angle are measured with an internal pressure of 180 kPa.

Figure 5:
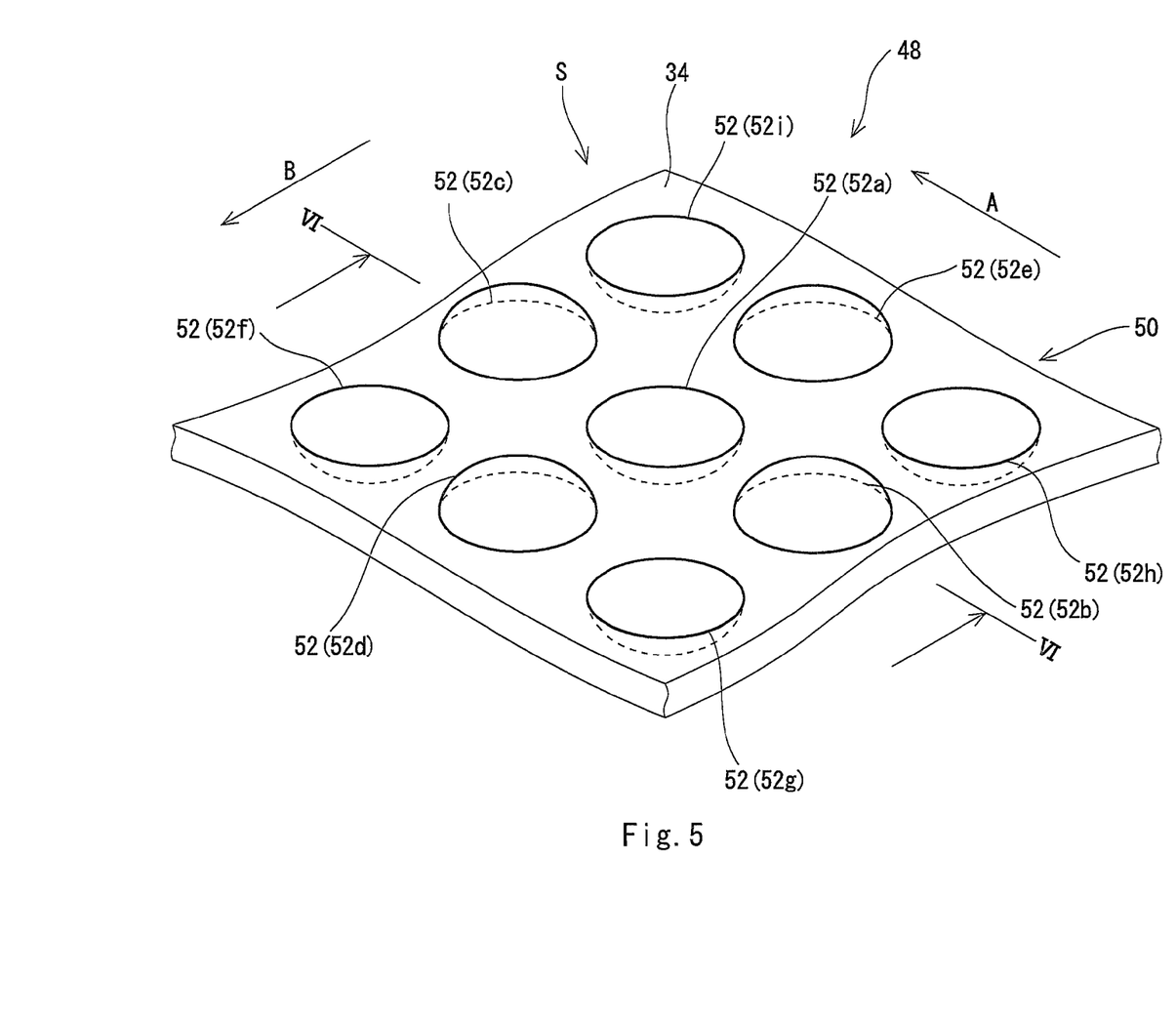
FIG. 5 is a perspective view showing a part of a pneumatic tire according to another embodiment of the present invention.

FIG. 5 shows an external surface 34 of a side portion S in a pneumatic tire 48 according to another embodiment of the present invention. In FIG. 5, a direction shown in an arrow line A represents an outward azimuth in a radial direction of the tire 48. A direction shown in an arrow line B represents a normal rotating direction of the tire 48. The tire 48 includes an agitating portion 50 on the external surface 34. The agitating portion 50 is positioned on an inner part in the radial direction with respect to a position indicative of a maximum width of the tire 48, which is not shown. The agitating portion 50 may be positioned on an outer part in the radial direction with respect to the position indicative of the maximum width of the tire 48. The agitating portion 50 includes a large number of agitators 52. In the tire 48, structures other than the agitating portion 50 are equivalent to those of the tire 2 shown in FIG. 1.

In the tire 48, an array pattern of the agitator 52 is an orthogonal array. As shown in the drawing, a unit constituted by agitators 52a, 52b and 52c arranged in the radial direction and a unit constituted by agitators 52a, 52d and 52e arranged in a rotating direction intersect with each other through the agitator 52a. In the tire 48, the agitating portion 50 has a structure in which a large number of units constituted by a plurality of agitators 52 arranged at a regular interval in the radial direction are disposed at a regular interval in the normal rotating direction. In the tire 48, the large number of agitators 52 are properly distributed over the external surface 34 of the side portion S. Therefore, a uniformity can be prevented from being inhibited by the agitators 52.

In the tire 48, the agitator 52a is a dimple and the agitators 52b, 52c, 52d and 52e which are close to the agitator 52a are pimples. In FIG. 5, furthermore, agitators 52f, 52g, 52h and 52i are dimples. In the tire 48, the dimple and the pimple are arranged alternately in the radial direction. The dimple and the pimple are also arranged alternately in the rotating direction. In the tire 48, the large number of agitators 52 included in the agitating portion 50 are constituted by the dimples and the pimples. In other words, the agitating portion 50 includes a large number of dimples and pimples.

Figure 6:
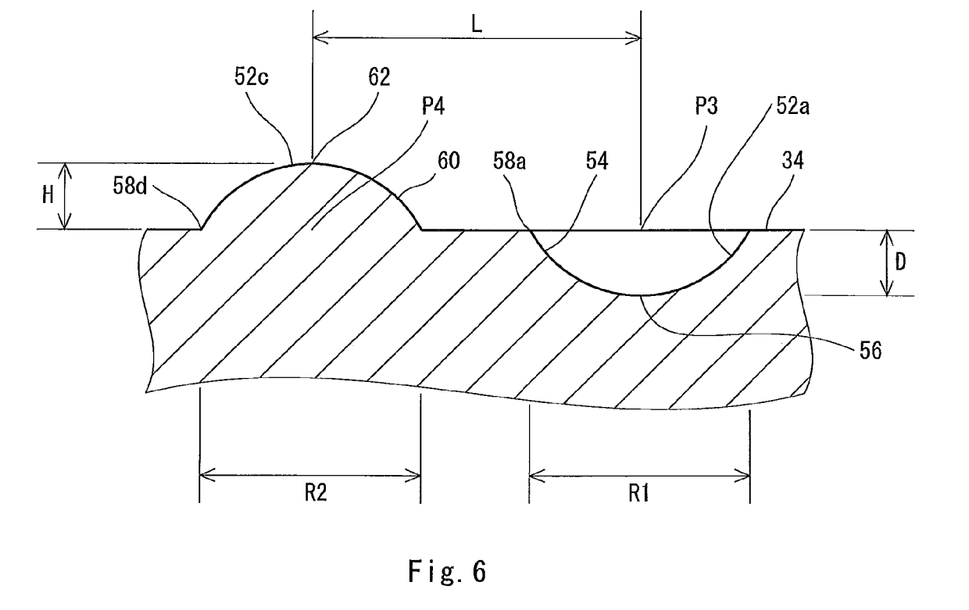
FIG. 6 is a sectional view taken along a VI-VI line in FIG. 5.

FIG. 6 shows sections of the agitator 52a to be the dimple and the agitator 52c to be the pimple. As shown in the drawing, the dimple 52a is dented inward from the external surface 34. A surface 54 of the dimple 52a takes a shape of a cup. The surface 54 is expanded concentrically from a bottom 56. An edge 58a of the dimple 52a is positioned in a boundary part between the dimple and the external surface 34 of the side portion S. In the tire 48, the edge 58a has a circular contour. Therefore, a stress caused by a distortion of the tire 48 can be properly distributed at the edge 58a. In the tire 48, the agitator 52 to be the dimple can prevent a durability of the tire 48 from being impeded.

The pimple 52c is protruded outward from the external surface 34. A surface 60 of the pimple 52c is expanded concentrically from a vertex 62. An edge 58b of the pimple 52c is positioned in a boundary part between the pimple 52c and the external surface 34 of the side portion S. In the tire 48, the edge 58b also takes a circular contour. Therefore, a stress caused by the distortion of the tire 48 can be properly distributed at the edge 58b. In the tire 48, the agitator 52 to be the pimple can prevent the durability of the tire 48 from being impeded.

As described above, in the tire 48, a large number of dimples and pimples to be the agitators 52 are provided on the external surface 34 of the side portion S. The agitator 52 can agitate air which is present around the running tire 48. By the agitation, it is possible to suppress a rise in a temperature of the side portion S. In the tire 48, it is possible to suppress a damage such as a separation or a breakdown of a carcass. The tire 48 is excellent in the durability.

In the tire 48, the dimples and pimples to be the agitators 52 are positioned on an inner part in the radial direction with respect to a position indicative of a maximum width over the external surface 34 of the side portion S. In other words, in the tire 48, the agitator 52 is positioned in the vicinity of a bead. In the tire 48, the agitator 52 can suppress a rise in a temperature of the vicinal part of the bead. In the tire 48, it is possible to suppress a damage such as a separation or a breakdown of the carcass. The tire 48 is excellent in the durability.

In the tire 48, a large number of agitators 52 included in the agitating portion 50 have the pimples and the dimples which are mixed. The mixture of the pimples and the dimples enhances an air agitating effect. The rise in the temperature can be suppressed properly. Therefore, the tire 48 is excellent in the durability. In the tire 48, furthermore, it is possible to properly maintain a weight. From this viewpoint, a ratio of a total number Nd of the dimples to a total number Np of the pimples is preferably equal to or higher than 3/7 and is more preferably equal to or higher than 1/2. The ratio is preferably equal to or lower than 7/3 and is more preferably equal to or lower than 2/1. It is particularly preferable that the ratio should be 1/1.

In respect of an effect for suppressing the rise in the temperature through the dimples and pimples to be the agitators 52, in the tire 48, a ratio of a number $Np_4$ of the pimples to which four dimples are close respectively to the total number Np of the pimples is preferably equal to or higher than 0.5 and is more preferably equal to or higher than 0.7. It is particularly preferable that the ratio should be one.

In FIG. 6, a double arrow line R1 represents an outside diameter of the agitator 52a to be the dimple. The outside diameter R1 indicates a diameter of a circle representing the contour of the edge 58a of the dimple. A point P3 indicates a center of the circle. A double arrow line R2 represents an outside diameter of the agitator 52c to be the pimple which is close to the dimple. The outside diameter R2 indicates a diameter of a circle representing the contour of the edge 58b of the pimple. A point P4 indicates a center of the circle. A double arrow line L represents a distance between the centers P3 and P4. In other words, the distance L indicates a distance between a center of one of the agitators 52 and a center of another agitator 52 which is close to one of the agitators 52. A double arrow line D represents a depth of the dimple. The depth D is obtained by measuring a height from the external surface 34 of the side portion S to the bottom 56 of the dimple. A double arrow line H represents a height of the pimple. The height H is obtained by measuring a height from the external surface 34 of the side portion S to the vertex 62 of the dimple.

In the tire 48, it is preferable that the outside diameter R1 should be equal to or greater than 3 mm and be equal to or smaller than 10 mm. By setting the outside diameter R1 to be equal to or greater than 3 mm, the agitator 52 to be the dimple can effectively agitate the air. In the tire 48, it is possible to suppress a rise in a temperature. The tire 48 is excellent in the durability. From this viewpoint, it is more preferable that the outside diameter R1 should be equal to or greater than 3.5 mm. By setting the outside diameter R1 to be equal to or smaller than 10 mm, it is possible to properly maintain a stiffness of the tire 48. In the tire 48, it is possible to maintain an excellent running performance. From this viewpoint, it is more preferable that the outside diameter R1 should be equal to or smaller than 7 mm.

In the tire 48, it is preferable that the outside diameter R2 should be equal to or greater than 3 mm and be equal to or smaller than 5 mm. By setting the outside diameter R2 to be equal to or greater than 3 mm, the agitator 52 to be the pimple can effectively agitate the air. In the tire 48, it is possible to suppress the rise in the temperature. The tire 48 is excellent in the durability. From this viewpoint, it is more preferable that the outside diameter R2 should be equal to or greater than 3.5 mm. By setting the outside diameter R2 to be equal to or smaller than 5 mm, it is possible to properly maintain the stiffness of the tire 48. In the tire 48, it is possible to maintain an excellent running performance. From this viewpoint, it is more preferable that the outside diameter R2 should be equal to or smaller than 4.5 mm.

In the tire 48, a ratio of the depth D to the outside diameter R1 is equal to or higher than 0.2 and is equal to or lower than 0.5. By setting the ratio to be equal to or higher than 0.2, the agitator 52 to be the dimple can effectively agitate the air. In the tire 48, it is possible to suppress the rise in the temperature. The tire 48 is excellent in the durability. From this viewpoint, the ratio is more preferably equal to or higher than 0.3 and is further preferably equal to or higher than 0.35. By setting the ratio to be equal to or lower than 0.5, it is possible to properly maintain the stiffness of the tire 48. In the tire 48, it is possible to maintain an excellent running performance. From this viewpoint, it is more preferable that the ratio should be equal to or lower than 0.45.

In the tire 48, a ratio of the height H to the outside diameter R2 is equal to or higher than 0.2 and is equal to or lower than 0.5. By setting the ratio to be equal to or higher than 0.2, the agitator 52 to be the pimple can effectively agitate the air. In the tire 48, it is possible to suppress the rise in the temperature. The tire 48 is excellent in the durability. From this viewpoint, the ratio is more preferably equal to or higher than 0.3 and is further preferably equal to or higher than 0.35. By setting the ratio to be equal to or lower than 0.5, it is possible to properly maintain the weight of the tire 48. In the tire 48, it is possible to maintain the excellent running performance. From this viewpoint, it is more preferable that the ratio should be equal to or lower than 0.45.

In the tire 48, it is preferable that a ratio of the distance L to the outside diameter R1 should be equal to or higher than 1.2 and be equal to or lower than 2. By setting the ratio to be equal to or higher than 1.2, it is possible to suppress an excessive reduction in an interval between the agitators 52 provided on the external surface 34 of the side portion S. It is possible to properly maintain an agitating effect obtained by the agitator 52 provided on the external surface 34. From this viewpoint, it is more preferable that the ratio should be equal to or higher than 1.3. By setting the ratio to be equal to or lower than 2, it is possible to suppress an excessive increase in the interval between the agitators 52. The agitator 52 can effectively agitate the air. In the tire 48, it is possible to suppress the rise in the temperature. The tire 48 is excellent in the durability. From this viewpoint, it is more preferable that the ratio should be equal to or lower than 1.9.

In the tire 48, it is preferable that a ratio of the distance L to the outside diameter R2 should be equal to or higher than 1.2 and be equal to or lower than 2. By setting the ratio to be equal to or higher than 1.2, it is possible to suppress the excessive reduction in the interval between the agitators 52 provided on the external surface 34 of the side portion S. It is possible to properly maintain the agitating effect obtained by the agitator 52 provided on the external surface 34. From this viewpoint, it is more preferable that the ratio should be equal to or higher than 1.3. By setting the ratio to be equal to or lower than 2, it is possible to suppress an increase in the interval between the agitators 52. The agitator 52 can effectively agitate the air. In the tire 48, it is possible to suppress the rise in the temperature. The tire 48 is excellent in the durability. From this viewpoint, it is more preferable that the ratio should be equal to or lower than 1.9.

Figure 7:
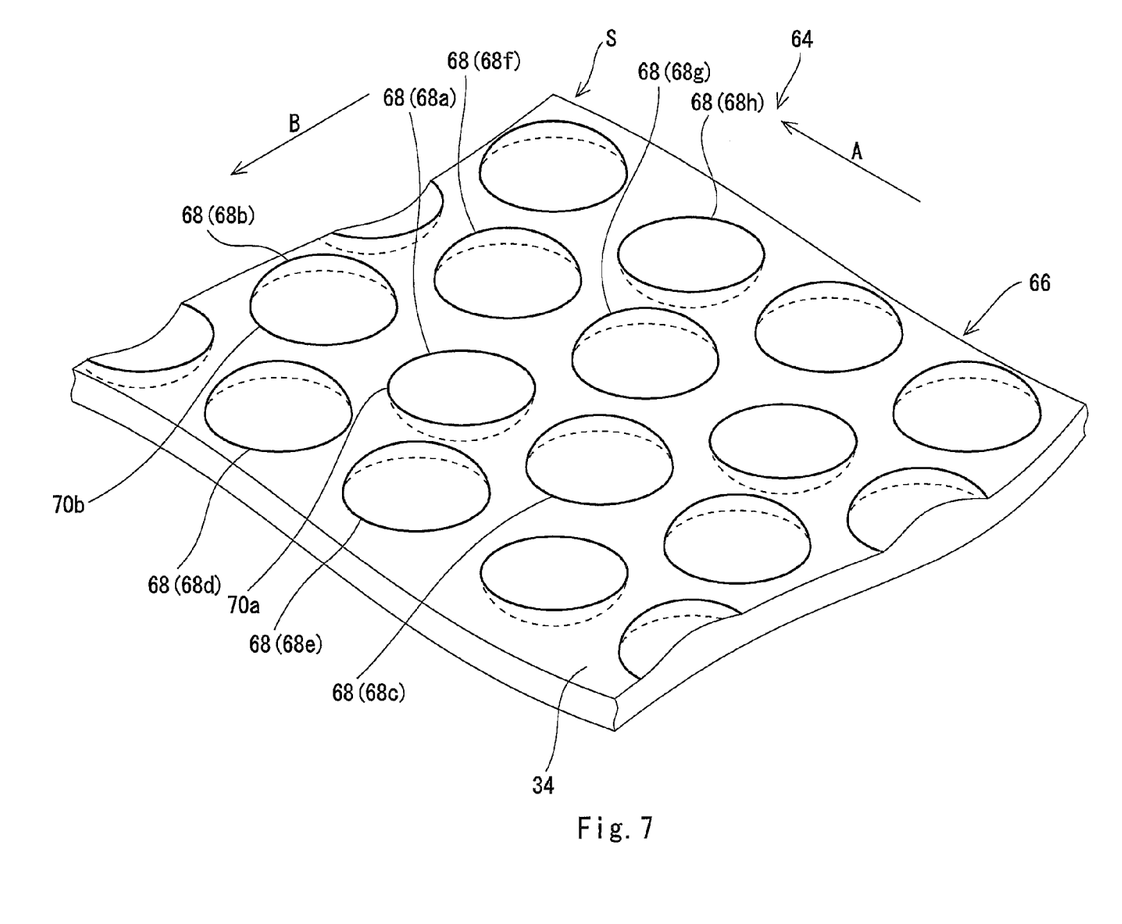
FIG. 7 is a perspective view showing a part of a pneumatic tire according to a further embodiment of the present invention.

FIG. 7 shows an external surface 34 of a side portion S in a pneumatic tire 64 according to a further embodiment of the present invention. In FIG. 7, a direction shown in an arrow line A represents an outward azimuth in a radial direction. A direction shown in an arrow line B represents a normal rotating direction of the tire 64. The tire 64 has an agitating portion 66 over the external surface 34. The agitating portion 66 is positioned on an inner part in the radial direction with respect to a position indicative of a maximum width of the tire 64, which is not shown. The agitating portion 66 may be positioned on an outer part in the radial direction with respect to the position indicative of the maximum width of the tire 64. The agitating portion 66 includes a large number of agitators 68. In the tire 64, structures other than the agitating portion 66 are equivalent to those of the tire 2 shown in FIG. 1.

In the tire 64, agitators 68b, 68c, 68d, 68e, 68f and 68g are close to a periphery of an agitator 68a. In the tire 64, in positions which are close to one of the agitators 68, six other agitators 68 are disposed. As shown in the drawing, the agitator 68b is positioned on an outside in the radial direction of the agitator 68a and the agitator 68c is positioned on an inside in the radial direction of the agitator 68a. The agitators 68d and 68e are positioned on a normal rotating side of the agitator 68a. In the agitators 68a, 68d and 68e, the agitator 68a is disposed in a position corresponding to an intermediate part between the agitators 68d and 68e in the radial direction. The agitators 68g and 68f are positioned on a reverse rotating side of the agitator 68a. In the agitators 68a, 68d and 68e, the agitator 68a is disposed in the position corresponding to the intermediate part between the agitators 68d and 68e in the radial direction. Furthermore, an agitator 68h is disposed in a position corresponding to an intermediate part between the agitators 68f and 68g in the radial direction at a reverse rotating side of the agitators 68f and 68g. The agitators 68f and 68g are also close to the agitator 68h.

As shown in the drawing, the agitators 68a, 68b and 68c are arranged in a line in the radial direction. The agitator 68a, the agitators 68e and 68g which are close to the agitator 68a, and the agitator 68h which is close to the agitator 68g are arranged zigzag in a rotating direction. In the tire 64, a unit constituted by the agitators 68a, 68b and 68c and a unit constituted by the agitators 68a, 68e, 68g and 68h intersect with each other through the agitator 68a. The array is also referred to as a zigzag array. In the tire 64, a large number of agitators 68 are arranged in a line at a regular interval in the radial direction, and at the same time, are arranged zigzag at a regular interval in the rotating direction. The large number of agitators 68 may be arranged in a line at a regular interval in the rotating direction, and at the same time, may be arranged zigzag at a regular interval in the radial direction. In the tire 64, the large number of agitators 68 are properly distributed over the external surface 34 of the side portion S. In the tire 64, a uniformity can be prevented from being impeded by the agitators 68.

In the tire 64, the agitators 68a and 68h are dimples. The agitators 68b, 68d, 68e, 68c, 68g and 68f which are close to the agitator 52a are pimples. In the tire 64, the large number of agitators 52 included in the agitating portion 50 are formed by the dimples and the pimples. In other words, the agitating portion 66 includes a large number of dimples and pimples.

In the tire 64, the agitator 68a to be the dimple is dented inward from the external surface 34. An edge 70a of the dimple 68a is positioned in a boundary part between the dimple 68a and the external surface 34 of the side portion S. In the tire 64, the edge 70a has a circular contour. Therefore, a stress caused by a distortion of the tire 64 can be properly distributed at the edge 70a. In the tire 64, the agitator 68 to be the dimple can prevent a durability from being impeded.

In the tire 64, the agitator 68b to be the pimple is protruded outward from the external surface 34. An edge 70b of the pimple 68b is positioned in a boundary part between the pimple 68b and the external surface 34 of the side portion S. In the tire 64, the edge 70b also has a circular contour. Therefore, the stress caused by the distortion of the tire 64 can be properly distributed at the edge 70b. In the tire 64, the agitator 68 to be the pimple can prevent the durability from being impeded.

As described above, in the tire 64, a large number of dimples and pimples to be the agitators 68 are provided on the external surface 34 of the side portion S. The agitators 68 can agitate air which is present around the running tire 64. By the agitation, it is possible to suppress a rise in a temperature of the side portion S. In the tire 64, it is possible to suppress a damage such as a separation or a breakdown of a carcass. The tire 64 is excellent in the durability.

In the tire 64, the agitator 68 is positioned on an inner part in the radial direction with respect to a position indicative of a maximum width over the external surface 34 of the side portion S. In other words, in the tire 64, the agitator 68 is positioned in the vicinity of a bead. In the tire 64, the agitator 68 can suppress a rise in a temperature of the vicinal part of the bead. In the tire 64, it is possible to suppress a damage such as a separation or a breakdown of the carcass. The tire 64 is excellent in the durability.

In the tire 64, a large number of agitators 68 included in the agitating portion 66 have the pimples and the dimples which are mixed. The mixture of the pimples and the dimples further enhances an air agitating effect through the agitator 68. As described above, in the tire 64, six pimples are close to one of the dimples. In the tire 64, the air agitating effect can be maintained to be obtained by the agitator 68, and at the same time, a weight of the tire 64 can be held properly. From this viewpoint, a ratio of a total number Nd of the dimples to a total number Np of the pimples is preferably equal to or higher than 3/7 and is more preferably equal to or higher than 1/2. The ratio is preferably equal to or lower than 7/3 and is more preferably equal to or lower than 2/1. In the tire 64, six pimples may be close to one of the pimples.

In respect of an effect for suppressing the rise in the temperature through the dimples and pimples to be the agitators 68, in the tire 64, a ratio of a number $Nd_6$ of the dimples to which six pimples are close respectively to the total number Nd of the dimples is preferably equal to or higher than 0.5 and is more preferably equal to or higher than 0.7. It is particularly preferable that the ratio should be one.

EXAMPLES

Although the effect of the present invention will be apparent from examples, the present invention should not be construed to be restrictive based on the description of the examples.

Example 1

There was obtained a tire for a passenger car according to an example 1 which has the basic structure shown in FIG. 1 and a specification shown in the following Table 2. The tire has a size of 195/65R15. The tire includes the agitating portion shown in FIG. 3. The agitating portion is provided with a large number of dimples. The dimples have an array pattern of an orthogonal array. The agitating portion does not include a pimple. The dimple has an outside diameter R1 of 4 mm. A ratio (D/R1) of a depth D of the dimple to the outside diameter R1 is 0.45. A ratio (L/R1) of a distance L between a center of one of the dimples and a center of the other dimple which is close to the one of the dimples to the outside diameter R1 is 1.5.

Comparative Examples 2 to 4 and Examples 9 and 10

A tire was obtained in the same manner as in the example 1 except that the depth D was varied to set the ratio (D/R1) as shown in the following Table 2.

Comparative Example 5 and Examples 6 to 8 and 11

A tire was obtained in the same manner as in the example 1 except that the depth D and the distance L were varied to set the ratio (D/R1) and the ratio (L/R1) as shown in the following Tables 1 and 2.

Comparative Example 6 and Examples 2 to 5 and 12 to 16

A tire was obtained in the same manner as in the example 1 except that the depth D, the outside diameter R1 and the distance L were varied to set the ratio (D/R1) and the ratio (L/R1) as shown in the following Tables 1 and 3.

Example 17

A tire was obtained in the same manner as in the example 1 except that an agitating portion has the structure shown in FIG. 5. The agitating portion includes a large number of dimples and pimples to be the agitators. An array pattern of the dimples and the pimples is an orthogonal array. The dimples and the pimples are arranged alternately. The dimple has an outside diameter R1 of 4 mm. A ratio (D/R1) of a depth D of the dimple to the outside diameter R1 is 0.4. A ratio (L/R1) of a distance L between centers of the agitators to the outside diameter R1 is 1.5. The pimple has an outside diameter R2 of 4 mm. A ratio (H/R2) of a height H of the pimple to the outside diameter R2 is 0.4. A ratio (L/R2) of the distance L between the centers of the agitators to the outside diameter R2 is 1.5. A ratio of a total number Nd of the dimples to a total number Np of the pimples is one. A ratio of a number $Nd_4$ of the dimples to which four pimples are close respectively to the total number Nd of the dimples is one.

Example 18

A tire was obtained in the same manner as in the example 1 except that an agitating portion is set to have the structure shown in FIG. 7. The agitating portion includes a large number of dimples and pimples. An array pattern of the dimples and the pimples is a zigzag array. The dimples and the pimples are arranged alternately. The dimple has an outside diameter R1 of 4 mm. A ratio (D/R1) of a depth D of the dimple to the outside diameter R1 is 0.4. A ratio (L/R1) of a distance L between centers of agitators to the outside diameter R1 is 1.5. The pimple has an outside diameter R2 of 4 mm. A ratio (H/R2) of a height H of the pimple to the outside diameter R2 is 0.4. A ratio (L/R2) of the distance L between the centers of the agitators to the outside diameter R2 is 1.5. A ratio of a total number Nd of the dimples to a total number Np of the pimples is 0.5. A ratio of a number $Nd_6$ of the dimples to which six pimples are close respectively to the total number Nd of the dimples is one.

Comparative Example 1

In a comparative example 1, the conventional tire put on the market is employed. The tire is not provided with an agitating portion.

[Evaluation]

A trial tire was attached to a rim of a drum durability testing machine to execute a running test. The rim was set to be 15×6J, an internal pressure was set to be 100 kPa (a low internal pressure state), a load was set to be 3.33 kN (340 kgf) and a speed was set to be 80 km/h. By the execution of the running test, an effect for suppressing a rise in a temperature and a durability were evaluated. The effect for suppressing a rise in a temperature was evaluated by measuring a surface temperature of the running tire through a non-contact type thermometer. The result is expressed in the following Tables 1 and 2 as an index number with a result of the comparative example 1 set to be 100. It is indicated that the effect for suppressing a rise in a temperature is more excellent if the numeric value is smaller. The durability was evaluated through an observation of an appearance of the tire after running by a distance of 30000 km. The result is expressed in the following Tables 1 and 2 with the case in which a damage is not observed and an excellent appearance is maintained is evaluated to be A and the case in which the damage is observed is evaluated to be B.

TABLE 1

Specification of Tire and Result of Evaluation

| | Comp. example 1 | Example 2 | Example 3 | Example 4 | Example 5 | Example 6 | Example 7 | Example 8 |
|---|---|---|---|---|---|---|---|---|
| Structure of agitating portion | — | FIG. 3 | FIG. 3 | FIG. 3 | FIG. 3 | FIG. 3 | FIG. 3 | FIG. 3 |
| Dimple Depth D [mm] | — | 0.8 | 1.2 | 1.5 | 1.2 | 1.6 | 1.6 | 1.6 |
| Outside diameter R1 [mm] | — | 2 | 3 | 3 | 3 | 4 | 4 | 4 |
| Ratio(D/R1) | — | 0.4 | 0.4 | 0.5 | 0.4 | 0.4 | 0.4 | 0.4 |
| Pimple Depth D [mm] | — | — | — | — | — | — | — | — |
| Outside diameter R2 [mm] | — | — | — | — | — | — | — | — |
| Ratio(D/R2) | — | — | — | — | — | — | — | — |
| Distance L [mm] | — | 3.6 | 5 | 5 | 5.4 | 4.0 | 4.8 | 6 |
| Ratio(L/R1) | — | 1.8 | 1.7 | 1.7 | 1.8 | 1.0 | 1.2 | 1.5 |
| Ratio(L/R2) | — | — | — | — | — | — | — | — |
| Effect for suppressing rise in temperature | 100 | 96 | 95 | 92 | 94 | 96 | 93 | 91 |
| Durability | B | B | A | A | A | A | A | A |

TABLE 2

Specification of Tire and Result of Evaluation

|  |  | Comp. example 2 | Comp. example 3 | Example 9 | Example 1 | Example 10 | Comp. example 4 | Example 11 | Comp. example 5 |
|---|---|---|---|---|---|---|---|---|---|
| Structure of agitating portion | | FIG. 3 | FIG. 3 | FIG. 3 | FIG. 3 | FIG. 3 | FIG. 3 | FIG. 3 | FIG. 3 |
| Dimple | Depth D [mm] | 0.4 | 0.8 | 1.2 | 1.8 | 2.0 | 2.4 | 1.6 | 1.6 |
|  | Outside diameter R1 [mm] | 4 | 4 | 4 | 4 | 4 | 4 | 4 | 4 |
|  | Ratio(D/R1) | 0.1 | 0.2 | 0.3 | 0.45 | 0.5 | 0.6 | 0.4 | 0.4 |
| Pimple | Depth D [nm] | — | — | — | — | — | — | — | — |
|  | Outside diameter R2 [mm] | — | — | — | — | — | — | — | — |
|  | Ratio(D/R2) | — | — | — | — | — | — | — | — |
| Distance L [mm] | | 6 | 6 | 6 | 6 | 6 | 6 | 8 | 10 |
| Ratio(L/R1) | | 1.5 | 1.5 | 1.5 | 1.5 | 1.5 | 1.5 | 2.0 | 2.5 |
| Ratio(L/R2) | | — | — | — | — | — | — | — | — |
| Effect for suppressing rise in temperature | | 96 | 92 | 73 | 66 | 63 | 81 | 80 | 89 |
| Durability | | B | B | A | A | A | B | A | B |

TABLE 3

Specification of Tire and Result of Evaluation

|  |  | Example 12 | Example 13 | Comp. example 6 | Example 14 | Example1 15 | Example 16 | Example 17 | Example 18 |
|---|---|---|---|---|---|---|---|---|---|
| Structure of agitating portion | | FIG. 3 | FIG. 3 | FIG. 3 | FIG. 3 | FIG. 3 | FIG. 3 | FIG. 5 | FIG. 7 |
| Dimple | Depth D [mm] | 2.0 | 2.4 | 1.6 | 2.4 | 3.2 | 4.0 | 1.6 | 1.6 |
|  | Outside diameter R1 [mm] | 5 | 6 | 8 | 8 | 8 | 8 | 4 | 4 |
|  | Ratio(D/R1) | 0.4 | 0.4 | 0.2 | 0.3 | 0.4 | 0.5 | 0.4 | 0.4 |
| Pimple | Depth D [mm] | — | — | — | — | — | — | 1.6 | 1.6 |
|  | Outside diameter R2 [mm] | — | — | — | — | — | — | 4 | 4 |
|  | Ratio(D/R2) | — | — | — | — | — | — | 0.4 | 0.4 |
| Distance L [mm] | | 9.0 | 10.8 | 10 | 10 | 10 | 10 | 6 | 6 |
| Ratio(L/R1) | | 1.8 | 1.8 | 1.25 | 1.25 | 1.25 | 1.25 | 1.5 | 1.5 |
| Ratio(L/R2) | | — | — | — | — | — | — | 1.5 | 1.5 |
| Effect for suppressing rise in temperature | | 83 | 81 | 99 | 97 | 97 | 96 | 83 | 83 |
| Durability | | A | B | B | A | A | A | A | A |

As shown in the Tables 1, 2 and 3, the tire according to each of the examples is excellent in the effect for suppressing a rise in a temperature and the durability. From the result of the evaluation, advantages of the present invention are apparent.

INDUSTRIAL APPLICABILITY

A tire according to the present invention can be attached to various vehicles.

The invention claimed is:

1. A pneumatic tire comprising a tread portion and a pair of side portions,
an agitating portion being provided on an external surface of each of the side portions,
the agitating portion including a large number of dimples and pimples,
the respective dimples being dented inward from the external surface,
the dimples having an edge with a circular contour,
the ratio of the dimple depth to its outside diameter being equal to or higher than 0.2 and being equal to or lower than 0.5,
the respective pimples protruding outward from the external surface,
the pimples having an edge with a circular contour,
the ratio of the pimple height to its outside diameter being equal to or higher than 0.2 and being equal to or lower than 0.5,
the dimples and the pimples being arranged in an orthogonal array,
the dimples and the pimples being arranged alternately,
the dimples and the pimples being arranged apart from each other with a flat external surface therebetween,
the dimple edges being positioned in a boundary part between the dimples and the external surface; and
the pimple edges being positioned in a boundary part between the pimples and the external surface.

2. A pneumatic tire comprising a tread portion and a pair of side portions,
an agitating portion being provided on an external surface of each of the side portions,
the agitating portion including a large number of dimples and pimples,
the respective dimples being dented inward from the external surface,
the dimples having an edge with a circular contour,
the ratio of the dimple depth to its outside diameter being equal to or higher than 0.2 and being equal to or lower than 0.5,
the respective pimples protruding outward from the external surface,
the pimples having an edge with a circular contour,
the ratio of the pimple height to its outside diameter being equal to or higher than 0.2 and being equal to or lower than 0.5, the dimples and the pimples being arranged in a zigzag array, six pimples being positioned close to each of the dimples, the dimples and the pimples being arranged apart from each other with a flat external surface therebetween, the dimple edges being positioned in a boundary part between the dimples and the external surface; and the pimple edges being positioned in a boundary part between the pimples and the external surface.

3. The pneumatic tire according to claim 1, wherein the ratio of the distance between a dimple center and a pimple center of a pimple adjacent to the dimple to the outside diameter of the dimple is equal to or higher than 1.2 and equal to or lower than 2.

4. The pneumatic tire according to claim 2, wherein the ratio of the distance between a dimple center and a pimple center of a pimple adjacent to the dimple to the outside diameter of the dimple is equal to or higher than 1.2 and equal to or lower than 2.

5. The pneumatic tire according to claim 1, wherein the ratio of the distance between a dimple center and a pimple center of a pimple adjacent to the dimple to the outside diameter of the pimple is equal to or higher than 1.2 and equal to or lower than 2.

6. The pneumatic tire according to claim 2, wherein the ratio of the distance between a dimple center and a pimple center of a pimple adjacent to the dimple to the outside diameter of the pimple is equal to or higher than 1.2 and equal to or lower than 2.

7. The pneumatic tire according to claim 1, wherein the dimples have an outside diameter equal to or greater than 3 mm and equal to or smaller than 10 mm.

8. The pneumatic tire according to claim 2, wherein the dimples have an outside diameter equal to or greater than 3 mm and equal to or smaller than 10 mm.

9. The pneumatic tire according to claim 1, wherein the pimples have an outside diameter equal to or greater than 3 mm and equal to or smaller than 5 mm.

10. The pneumatic tire according to claim 2, wherein the pimples have an outside diameter equal to or greater than 3 mm and equal to or smaller than 5 mm.

11. The pneumatic tire according to claim 1, wherein the agitating portion is positioned radially inside of the maximum width of the tire in an axial direction.

12. The pneumatic tire according to claim 2, wherein the agitating portion is positioned radially inside of the maximum width of the tire in an axial direction.

* * * * *